United States Patent [19]

Kurzinger et al.

[11] Patent Number: 5,352,420
[45] Date of Patent: Oct. 4, 1994

[54] PROCESS FOR THE PURIFICATION OF WASTE GAS HAVING A HIGH CHLORIDE CONTENT

[75] Inventors: Karl Kurzinger, Helmstadt; Rainer Stephan, Alzenau, both of Fed. Rep. of Germany

[73] Assignee: KRC Umwelttechnik GmbH, Wurzburg, Fed. Rep. of Germany

[21] Appl. No.: 47,063

[22] Filed: Apr. 16, 1993

Related U.S. Application Data

[63] Continuation of Ser. No. 821,308, Jan. 13, 1992, abandoned, which is a continuation of Ser. No. 509,782, Apr. 17, 1990, abandoned.

[30] Foreign Application Priority Data

Apr. 17, 1989 [DE] Fed. Rep. of Germany ....... 3912563
Nov. 29, 1989 [DE] Fed. Rep. of Germany ....... 3939413

[51] Int. Cl.$^5$ .................... B01D 53/14; B01D 53/34; C01B 7/01; C01B 7/07
[52] U.S. Cl. .................. 423/210; 423/240 R; 423/242.1; 423/488; 423/DIG. 18; 95/233
[58] Field of Search .................. 423/488, 481, 240 R, 423/DIG. 18, 659, 242.1; 55/71; 203/42; 95/233

[56] References Cited

U.S. PATENT DOCUMENTS

| | | | |
|---|---|---|---|
| 3,140,916 | 7/1964 | Lowdermilk | 423/488 |
| 3,980,758 | 9/1976 | Krumbock et al. | 423/488 |
| 4,031,192 | 6/1977 | Hafeli | 423/659 |
| 4,042,639 | 8/1977 | Gordon et al. | 423/488 |
| 4,073,871 | 2/1978 | Opitz et al. | 423/481 |
| 4,115,531 | 9/1978 | Opitz et al. | 423/488 |
| 4,147,756 | 4/1979 | Dahlstrom et al. | 55/71 |
| 4,301,137 | 11/1981 | Williams et al. | 423/DIG. 18 |
| 4,349,524 | 9/1982 | Yamashita et al. | 423/488 |
| 4,351,819 | 9/1982 | Riegel et al. | 423/240 |
| 4,488,884 | 12/1984 | Parigi | 423/488 |
| 4,617,180 | 10/1986 | Vogg | 55/71 |
| 4,704,972 | 11/1987 | Marchand | 55/80 |
| 4,714,604 | 12/1987 | Olson | 423/240 S |
| 5,174,865 | 12/1992 | Stultz et al. | 423/488 |

FOREIGN PATENT DOCUMENTS

| | | | |
|---|---|---|---|
| 206398 | 3/1956 | Australia | 423/240 R |
| 3623982 | 3/1987 | Fed. Rep. of Germany. | |
| 3623983 | 3/1987 | Fed. Rep. of Germany. | |
| 3611886 | 10/1987 | Fed. Rep. of Germany | 55/71 |
| 138763 | 11/1979 | German Democratic Rep. | 423/481 |
| 55-61924 | 5/1980 | Japan | 423/240 R |
| 1070515 | 6/1967 | United Kingdom | 423/488 |
| 1440008 | 6/1976 | United Kingdom | 423/481 |

OTHER PUBLICATIONS

Kirk-Othmer, "Encyclopedia of Chemical Technology," 3rd Ed., vol. 12, pp. 999–1000.
Hunter, F. L. "Absorption of Hydrogen Chloride," Transactions of the American Institute of Chemical Engineers, vol. 37, No. 5 (1941) pp. 760–761.

*Primary Examiner*—Michael Lewis
*Assistant Examiner*—Peter T. DiMauro
*Attorney, Agent, or Firm*—Wegner, Cantor, Mueller & Player

[57] ABSTRACT

A process, for purification of a combustion flue gas from a garbage incineration plant having a chloride content and further contaminated with HF, $SO_2$, $NO_x$ and heavy metals, and for recovery of HCl, including (a) removing HCl and HF and heavy metals from the combustion flue gas, in a first absorbent step, by washing the combustion flue gas with water for the first absorbent step, the water for the first absorbent step initially containing up to 20 g/l of HCl, and by separating HF in water from the first absorbent step from HCl in the water from the first absorbent step, the HCl in the water from the first absorbent step being concentrated to a level in excess of 50 g/l; (b) separating part of the concentrated HCl in the water from the first absorbent step in a rectification, within a single plant, into a more concentrated hydrochloric acid solution and a bottoms fraction; (c) removing further HCl, HF and heavy metals, which remain in the combustion flue gas after the first absorbent step, from the combustion flue gas, in a second absorbent step, by washing the combustion flue gas with water for the second absorbent step, water from the second absorbent step, containing up to 20 g/l of HCl, being recycled and used as the water for the first absorbent step; and (d) removing $SO_2$, which remains in the combustion flue gas after the first absorbent step and after the second absorbent step, from the combustion flue gas in a subsequent step.

12 Claims, No Drawings

PROCESS FOR THE PURIFICATION OF WASTE GAS HAVING A HIGH CHLORIDE CONTENT

This application is a continuation of U.S. patent application Ser. No. 07/821,308 filed Jan. 13, 1992, abandoned; which is a continuation of Ser. No. 07/509,782 filed Apr. 17, 1990, abandoned.

The present invention relates to a process for the purification of waste gas (flue gas) having a high chloride content. More specifically, the present invention relates to purification of a flue gas from an incineration plant by a multi-step absorption of contaminants. In a first step the strongly acidic components of the waste gas such as HCl and HF are removed by washing with water which initially contains up to 20 g/l of HCl. In subsequent steps the less acidic components of the waste gas such as $SO_2$ and $NO_x$ are removed.

In the purification of flue gases, HCl and HF play a major role as well as $SO_2$ and $NO_x$. This is especially so, if the flue gas is derived from a waste incineration plant. Depending on the composition of the waste or garbage subjected to incineration, the HCl content of the flue gas may be greater than 10 g/m$^3$. As a rule, such high HCl content requires a particular treatment in flue gas purification plants. Today this treatment is mostly accomplished by a step of HCl removal preceding the step of $SO_2$ removal. In this treatment, the HCl separation is often carried out simultaneously with an operation of quenching the flue gas wherein frequently alkaline chemicals are already added. Furthermore, in this quenching step a major part of the residual dust which remained in the flue gas is deposited.

The solution or suspension obtained in this separation procedure, which usually is still acidic due to hydrochloric acid present, generally contains most of the heavy metals contained in the flue gas. This hydrochloric acid solution or suspension is usually subjected to waste water treatment. Upon the addition of an alkali or of alkaline earth carbonates or hydroxides, neutralization occurs along with a precipitation of the heavy metals. After the filtration of the suspension, the filtrate is usually passed to an outlet ditch or evaporated with the residue which is conveyed to a dump. If the waste water is deposited into an outlet ditch, it mostly contains relatively high amounts of soluble salts and some residual contents of heavy metal.

If it is intended to recover utilizable salts such as common salt or calcium chloride from such residues, an efficient and expensive procedure of waste water treatment must generally be carried out prior to the evaporation and, depending on the circumstances, the crystal mass precipitated in the course of the evaporation must be subjected to one or more recrystallization steps which involve a high expenditure for apparatus and energy. Nevertheless, this generally does not ensure the degrees of purity for the salts required in practice.

It is an object of the present invention to improve and simplify the process as well as to render it safer. The invention is useful for the purification of flue gas having a high chloride content, and especially of flue gas from an incineration plant. The invention enables amounts as large as possible of re-usable products to be recovered, whereas only minor amounts of waste materials burdening waste water effluent or the dumping ground environment to be produced. More particularly, it is the object of the invention to conduct the removal of the strongly acidic components such as HCl and HF from the waste gas in a manner so that re-usable substances are recovered therefrom reliably and inexpensively. The process is based on those processes wherein in a first step the strongly acidic components of the waste gas such as HCl and HF are removed by washing with water which initially contains up to 20 g/l of HCl, and in subsequent steps the less acidic components of the waste gas such as $SO_2$ and $NO_x$ are removed.

This object can be attained in a surprisingly easy way by concentrating the hydrochloric acid in the first step to a level in excess of 50 g/l of HCl, and preferably in excess of 80 g/l of HCl, and separating the diluted hydrochloric acid thus obtained by rectification into a more highly concentrated hydrochloric acid and a bottoms fraction.

It has been surprisingly found that in this way it is possible to obtain in particular an azeotropic hydrochloric acid of about 22% HCl which, in addition, is almost free of impurities and particularly of heavy metals. This result was especially surprising because in the acids obtained by the concentrating step there are still present larger amounts of heavy metals and other salts soluble in water and hydrochloric acid and nevertheless, upon rectification, these materials remain in the bottoms fraction. This was not foreseeable since it has been known that in the gases from garbage incineration plants there are also present metal chlorides that are volatile in steam. Furthermore, it has been surprisingly found that the solids and salts accumulated in the rectification bottoms such as, e.g., calcium sulfate, do not produce any baking build-up and, hence, do not cause any malfunctions. In conventional evaporators for waste waters containing chloride salts, such build-up causes frequent failures and longer periods of breakdown to occur.

If in the past in a first step the strongly acidic flue gas components such as HCl and HF were separated only by washing with water without the addition of alkaline reagents, the concentration of HCl was allowed to be 20 g/l of HCl as the maximum, because otherwise to large amounts of HCl would be left in the vent gas. However, a hydrochloric acid which was so highly diluted could not economically be processed to give a more concentrated hydrochloric acid. Thus, according to the invention, this diluted hydrochloric acid containing up to 20 g/l of HCl is subjected to a step of concentrating it to more than 50 g/l of HCl.

It is preferred that the concentrating step leads to a level within the range of from 80 to 130 g/l of HCl. Depending on the HCl content of the flue gas, higher levels are obtainable in the concentrating step. For example, this concentrating operation in the first step may be effected bu washing the HCl continuously in a counter-current flow whereupon a concentrated hydrochloric acid is obtained.

A concentrating operation carried out in a discontinuous mode by counter-current flow has proven to be more advantageous. In this mode of operation, the flue gas to be purified is passed through at least two washing stages wherein it is first contacted with batches of a more diluted hydrochloric acid the concentration of which is increased, and thereafter it is subjected to washing with fresh water batches which are allowed to become concentrated to a level of up to 20 g/l of HCl. As soon as this critical limit of residual HCl content of the flue gas has been reached, the batch is replaced by fresh water. The hydrochloric acid having been concentrated to at least 50 g/l of HCl is taken out and replaced by the more diluted HCl washing solution containing a maximum of 20 g/l of HCl.

Above all, this mode of operation can to be carried out with simpler equipment. Changing batches may be readily controlled by monitoring the chloride content in the washing solutions. To render the process flexible, it lends itself to provide intermediate reservoirs for the various fractions of the washing solutions.

A further preferred embodiment of the process consists of conducting the concentrating procedure in a quencher wherein the flue gas is cooled to the minimum temperature of cooling and the residual dust is removed. In the bottoms of such a quencher, the HCl content is readily increased to at least 50 g/l of HCl. Said quencher bottom product can be directly introduced into the rectification plant, if necessary after the removal of solids.

Steam is removed from the head of the rectification unit, which steam may be recycled into the waste gas purification plant at any optional location. From the bottoms there is withdrawn a fraction not tending to form a build-up formation and having a HCl content corresponding to the rectification pressure. Furthermore, the azeotropic mixture corresponding to the rectification pressure of HCl and water is withdrawn from the rectification column. If the rectification is effected under normal pressure, an azeotropic hydrochloric acid of about 22% HCl is obtained. If it is desired to produce a hydrochloric acid having a higher concentration, the rectification pressure must be reduced. If higher pressures are employed, an azeotropic mixture of HCl and water is produced which, when condensed, contains less than 22% HCl.

Upon rectification at normal pressure one obtains first an azeotropic hydrochloric acid of about 22% HCl, which contains only traces of heavy metals such as mercury and is not contaminated by HF. HF undergoes a reaction with calcium and silicon compounds which are present during the concentrating step and, at the latest, the rectifying steps. It is discharged from the process together with the solids from the quencher bottoms and/or bottoms of the rectification.

One obtains according to the invention an azeotropic hydrochloric acid corresponding to the respective rectification pressure. The acid is free of interfering impurities and can be used for various purposes. If desired, it may be used to neutralize sufficiently pure alkali or alkaline earth carbonates and/or hydroxides and to recover therefrom commercially utilizable clean salts which at least do not contain the high contents of heavy metals presently expected.

The bottoms fraction of the rectification can also be utilized in several ways using to the invention. It is possible, for example, if indicated after separation from the solids, to recycle part of the bottoms fraction to the concentrating stage, especially since it still contains considerable amounts of HCl. It is also possible to spray part of this bottom fraction of the rectification into the flue gas stream prior to the deposition of dust. Thus, the solid components are deposited together with the dust, while the HCl gas and the water are recycled into the process. Furthermore, it is possible to pass part of the bottom fraction of the rectification to the fly ash processing step and thereby to remove it from the process. The fly ash in general contains alkaline components in an amount sufficient to neutralize the hydrochloric acid contained in the bottoms product and to render harmless that proportion of HCl discharged from the process.

Modern purification units for flue gases from garbage incineration plants have, to an increasing extent, been equipped with additional condensation filters or wet-E filters. The waste water from these filters can be employed as the absorbent for HCl and HF in the first stage, so that also here waste materials are avoided that are undesirable or give rise to problems.

Thus, the absorption with water of the strongly acidic components of the waste water, i.e. HF and HCl, is followed, optionally after a purification using condensation filters or wet-E filters, by the conventional removal of $SO_2$ and $NO_x$. More particularly, for the desulfurization, Applicants' two-cycle process using limestone has proven to be useful. The subsequent removal of $NO_x$ can be achieved by a conventional known procedure.

The water and energy balances of the process of the invention show that concentrating the hydrochloric acid and subsequent rectification to form concentrated hydrochloric acid does not cause any noticeable increase in the water consumption or energy consumption. The steam formed in the concentrating and rectifying steps is needed to condition the gas to be purified for the desulfurization. Discharged from the process is only the water content of the more concentrated azeotropic hydrochloric acid. Furthermore, solids are produced which are removed from the dust separator, quencher bottoms and the effluent water from the condensation or wet-E filters. According to the invention, these fractions can also be treated, processed or put into further use either in the same manner as before or in a slightly modified manner. From the process according to the invention, there is additionally recovered a clean and readily usable concentrated hydrochloric acid, so that the elimination of chlorides as so far practiced becomes unnecessary.

For some intended uses a concentration of higher than the 22% azeotropic mixture of hydrochloric acid is required. According to the invention, such a hydrochloric acid of a higher concentration can be produced by subjecting the flue gas, after the quenching procedure, to a multi-stage absorption which is discontinuous with respect to the liquid phase. In a first step following the quenching step the hydrochloric acid is concentrated to the desired final concentration, while the fine-cleaning of the flue gas is effected only in the last absorption step.

In the course thereof, the dust-loaded flue gas is subjected to at least three steps of wet washing. The stage for the first step is designed as a concurrent spray absorber. First, the flue gas is quenched at several spray levels and liberated from dust and heavy metal compounds. The washing agent is recirculated. Evaporated liquid is intermittently or continuously passed to the quencher bottoms. By a time-controlled discharge of liquid from the quencher bottoms, the salt concentration in the washing agent is limited to a predetermined value.

In the described first step, there is adjusted a HCl concentration which is in an equilibrium with the HCl content of the flue gas. Now, the flue gas, via a stack tray, passes into the second stage, and therefrom optionally into the further stages of the absorber, which stages are preferably designed as counter-current washer with fillings. In each stage the water is recirculated. In this process, the first stage behind the quencher acts as a concentrating stage, while in the following stages, and particularly in the last stage, the fine-cleaning is effected. If the desired values of the purified gas at the outlet of the last absorber are reached, the fine-purification stage is not capable of absorbing any further HCl, because otherwise the values of the purified gas would increase. It is not later than at this time that the concentrated acid is removed from the last stage into the receiver of the previous step wherein it may be further concentrated. The last purification stage or fine-purification, after changing the liquid, is charged with fresh water or waste water obtained from the total process.

In the design as described, the concentration in the penultimate stage is highly dependent on the demanded HCl level in the pure gas. If the demanded HCl level in the pure gas is desired to be high, then it takes a relatively long time until the equilibrium concentration, for the pure gas level has been established in the liquid phase. For a corresponding period of time the concentration may be carried out in the preceding step, where the maximum concentration value may be reached which is in equilibrium with the HCl partial pressure at the inlet of the penultimate stage.

However, since in most cases the levels demanded for pure gas are very low (<5 to 10 mg/m$^3$), the equilibrium concentration will not be obtained using three stages only. Thus, in order to obtain a highly concentrated hydrochloric acid, on the one hand, and a low pure gas level, on the other hand, it is generally necessary, to operate in four absorption stages altogether.

An expedient variant of the process according to the invention utilizes the amount of water required for quenching for the fine-purification of the flue gas. To this end, said amount of water is added in the last stage and there absorbs the remaining hydrochloric acid. The resulting very diluted hydrochloric acid is then directly passed into the quenching stage. This arrangement allows for an extended period of time to pass until the liquid must be changed, so that in the median stages a higher concentration can be attained.

A further advantageous embodiment of the process according to the invention consists of turning off the liquid supply in the quenching step a definite time before reaching the pure gas level at the outlet of the last absorber. The hot flue gas causes part of the quencher liquid to evaporate, so that the hydrochloric acid contained therein is released to a considerable extent into the gaseous state. Thus, at the outlet of this stage the HCl partial pressure is increased whereby the HCl concentration in the following concentrating step also is increased.

During the time of the HCl evaporation in the quenching step, the washing cycle of the fine purification stage is supplied with the amount of water provided therefor, so that the pump reservoir thereof requires only have the size appropriate therefor. The HCl evaporation in the quencher may be continued until the desired level is reached in the purified gas after the fine-purification. Then, upon change of the liquid, the stored proportion of the liquid is added to the quencher bottoms. More particularly, if the flue gas enters into the quenching stage after already having been cooled to a very high degree, the amount of water required for quenching is reduced. Then it will be useful to employ the described procedure of HCl evaporation and to extend the total process by one more step. Then it is nevertheless possible to reach the demanded high HCl concentration in the concentrating step at the same low HCl pure gas level. Thus, it is possible, through several steps, to obtain a highly concentrated hydrochloric acid and, at the same time, to retain low HCl levels in the purified gas even using relatively much cooled flue gases.

The process according to the invention may be controlled by measuring the HCl levels in the purified gas. As soon as the demanded HCl levels in the purified gas have been reached, the change of liquids from the following stages to the preceding stages, as described is carried out.

The process according to the invention is further illustrated by the following Example run under aggravated conditions of operation.

EXAMPLE

In a garbage incineration plant, flue gases containing about 1.5 g/m$^3$ of HCl are fed after the dust separator to a quencher supplied with industrial water. The residual fine dust is collected in the quencher. In the quencher bottoms, due to the evaporation of water, the HCl concentration rises to about from 60 to 70 g/l of HCl. The quencher bottoms, after the separation therefrom of the solids by means of a centrifuge, are introduced into a rectification plant, from which steam is withdrawn at the head, and a suspension free from build-up is withdrawn from the bottom. Approximately at a height one third from the bottom of the rectification column, the azeotropic mixture of HCl and water is withdrawn. After condensation it forms an uncolored hydrochloric acid having a content of 22% HCl. The contents of mercury and other heavy metals are below the limits of detection or within the ranges of a customary, commercially available azeotropic hydrochloric acid. The flue gas stream of the incineration plant is passed from the quencher which acts as a first washing stage, to a second washing stage, wherein care is taken that the contents of hydrochloric acid do not exceed 20 g/l of HCl. Thereby it is ensured that the vent gas stream exiting from this stage only comprises the admissible HCl content. The diluted hydrochloric acid from this washing stage is introduced into the quencher.

Downstream of the described chloride washing stage there is located a wet-E filter. From there, the vent gas stream is led into a two-cycle absorption washer with limestone and desulfurized. The waste water from the wet-E filter is passed to the washing water of the chloride washing.

We claim:

1. A process, for purification of a combustion flue gas from a garbage incineration plants having a hydrogen chloride content and further contaminated with HF, SO$_2$, NO$_x$ and heavy metals, and for the recovery of HCl, said process comprising:
(a) removing HCl and HF and heavy metals from the combustion flue gas, in a first absorption step, by washing the combustion flue gas with water for said first absorption step, said water for said first absorption step initially containing up to 20 g/l of HCl, to form a wash water from said first absorption step containing HCl, HF, and heavy metals, wherein the HCl in said wash water is further concentrated to a level in excess of 50 g/l;
(b) separating part of the concentrated HCl in said water from said first absorption step in a rectification, into a more concentrated hydrochloric acid solution, said more concentrated hydrochloric acid solution being substantially free of HF and heavy metals, and a bottoms fraction, said bottoms fraction containing heavy metals;

(c) reaching HF with compounds of calcium and silicon which are present during the concentrating and at the latest the rectification to remove the HF for discharge with said bottoms fraction;

(d) removing further HCl, HF and heavy metals, which remain in the combustion flue gas after said first absorption step, from the combustion flue gas, in a second absorption step, by washing the combustion flue gas with water for said second absorption step, wherein water from said second absorption step, containing up to 20 g/l of HCl, is recycled and used as said water for said first absorption step; and (e) removing $SO_2$, which remains in the combustion flue gas after said first absorption step and after said second absorption step, from the combustion flue gas in a subsequent step.

2. The process according to claim 1, wherein the concentrating of HCl in step (a) is carried out in a discontinuous mode by counter-current flow.

3. The process according to claim 1, wherein the concentrating of HCl in (a) is carried out in a quencher such that the combustion flue gas is cooled and residual dust is removed from the combustion flue gas.

4. The process according to claim 1, wherein the concentrating of HCl in (a) is carried out in an absorption stage between a quencher stage and a second absorption stage.

5. The process according to claim 1, wherein the rectification is carried out at normal pressure, and an azeotropic hydrochloric acid of about 22% by weight of HCl is recovered from the rectification.

6. The process according to claim 1, wherein part of the bottoms fraction from the rectification is recycled to the rectification for further concentration.

7. The process according to claim 1, further comprising a dust separation step wherein part of the bottoms fraction of the rectification is sprayed into the combustion flue gas prior to the dust separation step.

8. A process, for purification of a combustion flue gas from a garbage incineration plants having a hydrogen chloride content and further contaminated with HF, $SO_2$, $NO_x$ and heavy metals, and for the recovery of HCl, said process comprising:

(a) removing HCl and HF and heavy metals from the combustion flue gas, in a first absorption step, by washing the combustion flue gas with water for said first absorption step, said water for said first absorption step initially containing up to 20 g/l of HCl, to form a wash water from said first absorption step containing HCl, HF, and heavy metals, wherein the HCl in said wash water is further concentrated to a level in excess of 50 g/l;

(b) separating part of the concentrated HCl in said water from said first absorption step in a rectification, into a more concentrated hydrochloric acid solution, said more concentrated hydrochloric acid solution being substantially free of HF and heavy metals, and a bottoms fraction, said bottoms fraction containing heavy metals;

(c) reacting HF with compounds of calcium and silicon which are present during the concentrating and at the latest the rectification to remove the HF for discharge with said bottoms fraction;

(d) removing further HCl, HF and heavy metals, which remain in the combustion flue gas after said first absorption step, from the combustion flue gas, in a second absorption step, by washing the combustion flue gas with water for said second absorption step, wherein water from said second absorption step, containing up to 20 g/l of HCl, is recycled and used as said water for said first absorption step; and (e) removing $SO_2$, which remains in the combustion flue gas after said first absorption step and after said second absorption step, from the combustion flue gas in a subsequent step, wherein part of the bottoms fraction of the rectification is passed to a fly ash processing step.

9. The process according to claim 1, wherein said water for said first absorption step comprises effluent water from a condensation filter or wet-E filter.

10. The process according to claim 1, wherein the combustion flue gas is subjected to a multi-stage absorption which is discontinuous with respect to said water from said first absorption step and which fine-cleans the combustion flue gas in a final absorption step.

11. The process according to claim 1, wherein the HCl in said wash water from said first absorption step is concentrated in (a) to a concentration in excess of 80 g/l.

12. The process according to claim 1, wherein residual HCl, HF and heavy metals remaining in the flue combustion gas are removed from the flue combustion gas in one or two additional absorption stages.

* * * * *